(12) United States Patent
Lake et al.

(10) Patent No.: US 6,593,924 B1
(45) Date of Patent: Jul. 15, 2003

(54) RENDERING A NON-PHOTOREALISTIC IMAGE

(75) Inventors: Adam T. Lake, Beaverton, OR (US); Carl S. Marshall, Portland, OR (US); Michael S. Rosenzweig, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/410,947

(22) Filed: Oct. 4, 1999

(51) Int. Cl.[7] .............................................. G06T 15/60
(52) U.S. Cl. ...................................... 345/426; 345/423
(58) Field of Search ................................. 345/420, 423, 345/421, 426, 589

(56) References Cited

PUBLICATIONS

Foley et al (Computer Graphics: Principles and Practice: second Edition in C: 1997: p. 1102).*
Markosian et al ("Real–Time Nonphotorealistic Rendering": Proceedings of the 24th annual conference on Computer Graphics and Interactive techniques, Aug. 1997).*
Chow ( Optimized geometry Compression for Real–Time Rendering): Proceedings Visualization 1997, IEEE.*
Zeleznik et al (Sketch: An Interface for Sketching 3D Scenes: 1996 ACM).*
Elber (Line Art Rendering via a Coverage of isoparametric Curves: IEEE 1995).*
Taubin et al., "3D Geometry Compression." SIGGRAPH '98 Course Notes, 1998, (Index).
Deering, "M. Geometry Compression." Computer Graphics. SIGGRAPH '95, 1995, pp 13–20.
Catmull et al. "Recursively Generated B–Spline Surfaces on Arbitrary Topological Meshes." Computer Aided Geometric Design, vol. 10, No. 6, 1978.

* cited by examiner

Primary Examiner—Mano Padmanabhan
(74) Attorney, Agent, or Firm—Fish & Richardson P.C.

(57) ABSTRACT

A non-photorealistic image is rendered from an original model in a process which includes selecting a normal in the original model, selecting a vector from a set of vectors, and substituting the vector for the normal to produce a non-photorealistic image corresponding to the original model. The vector may be selected from a subdivision surface that defines a set of vectors, or it may be selected from a set containing a vector pointing substantially toward a virtual light source and a parameterized vector pointing between the virtual light source and a virtual eyepoint.

30 Claims, 15 Drawing Sheets

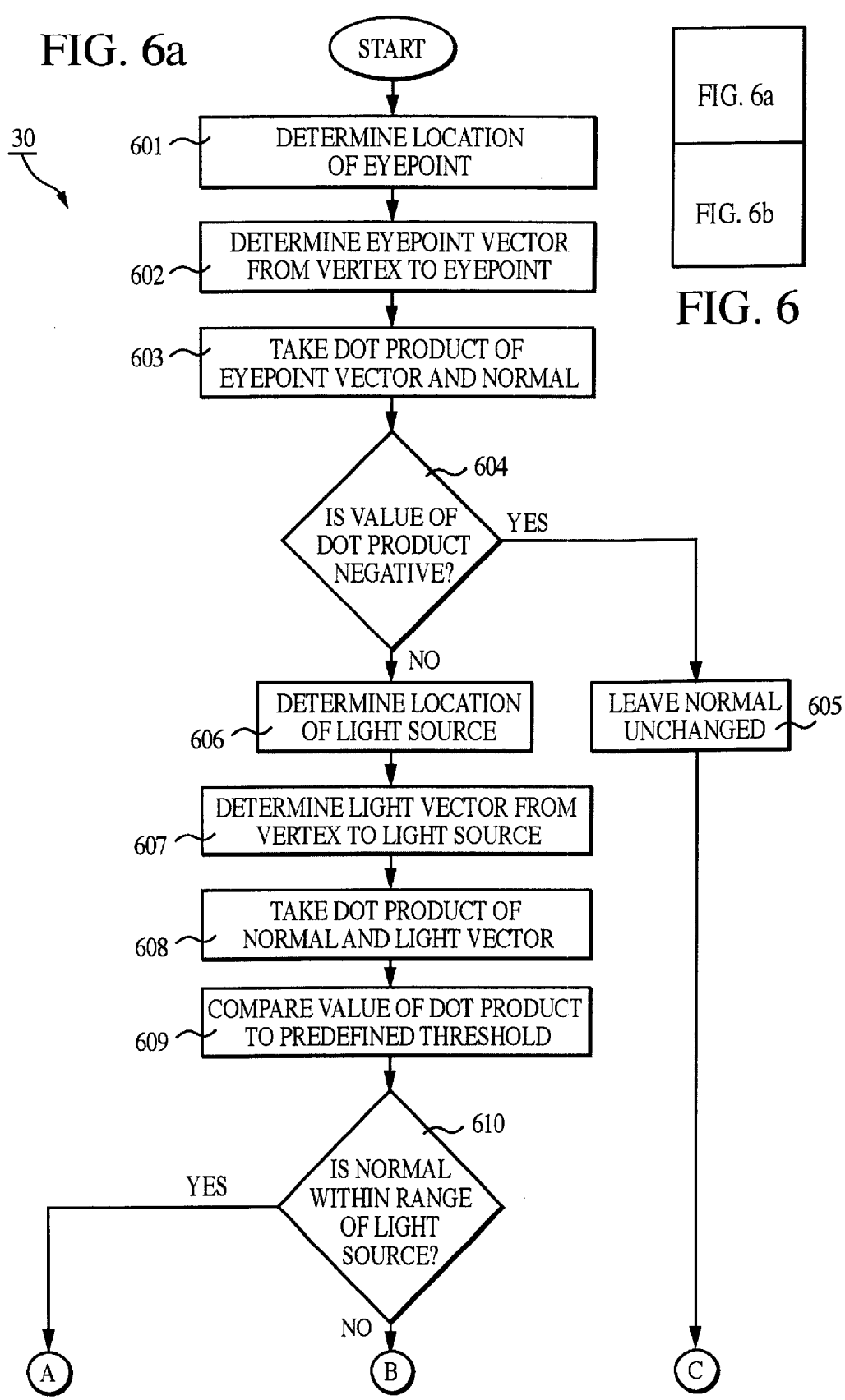

RENDERING A NON-PHOTOREALISTIC IMAGE

COPYRIGHT NOTICE

A portion of the disclosure of this patent application contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to rendering a non-photorealistic ("NPR") image from an original model.

NPR rendering is a process in which a three-dimensional ("3D") model is rendered as a two-dimensional ("2D") image with shading that is non-photorealistic. There are many methods of rendering non-photorealistically. One of these methods produces a 2D cartoon-like effect, in contrast to photorealistic shading, such as gouraud or phong shading, which produces a 3D effect.

Traditional animation techniques involve drawing 2D images on cels, often by hand. Each time a new perspective of the original 3D model is required, an entirely new image is drawn on a new cel. Recently, computers have been used in the animation process.

SUMMARY OF THE INVENTION

In general, in one aspect of the invention, a method for use in rendering an NPR image from an original (e.g., 3D) model, selects a normal in the original model and substitutes a vector for the normal to produce an NPR image corresponding to the original model.

Among the advantages of the invention are one or more of the following. Substituting vectors for normals in the NPR image alters the shading of the NPR image. For example, the shading of the NPR image can be altered so that the image does not appear photorealistic. NPR images, such as cartoon images, can thus be rendered and shaded for any perspective of the original model. For example, an original model can be positioned, and a shaded NPR image rendered for that position. The original model can then be repositioned and a shaded NPR image rendered for the new position.

Other advantages and features will become apparent from the following description and the claims.

BRIEF DESCRIPTION OF THE DRAWINGS

FIG. 15b is a view of the gouraud-shaded counterpart to the image of FIG. 15a.

DESCRIPTION

Figure 1:
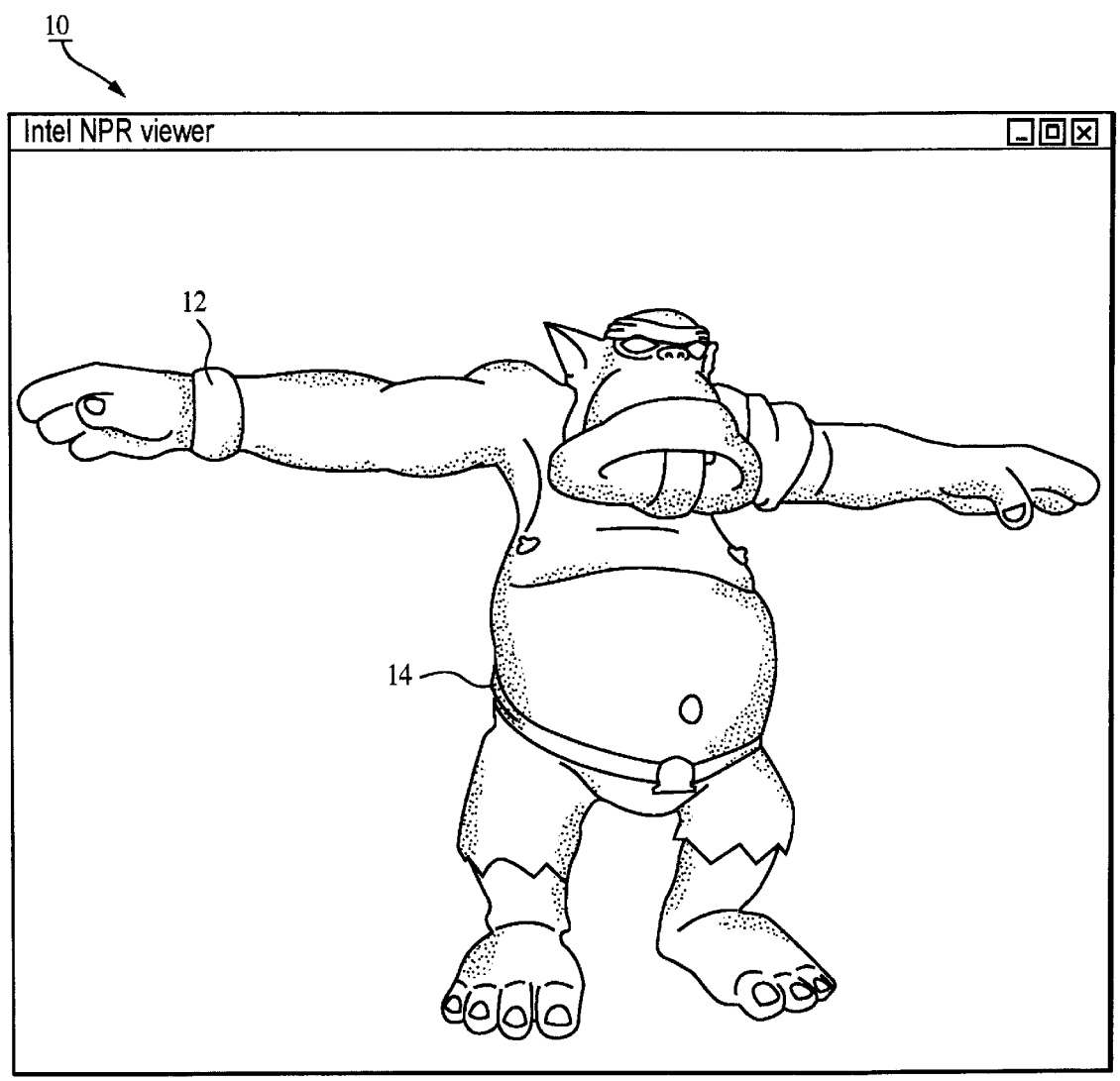
FIG. 1 is a view of a 3D model.
Figure 2:
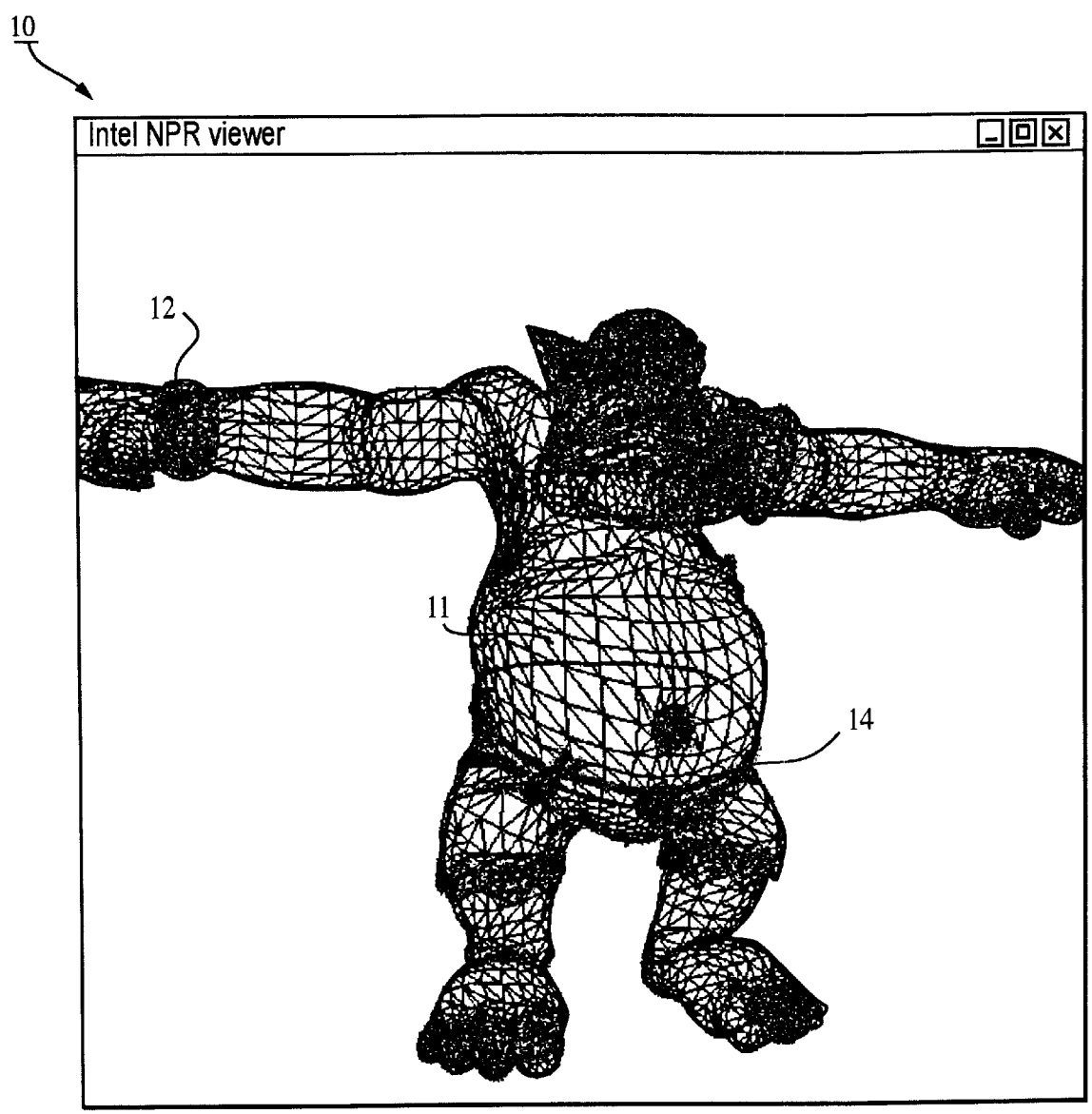
FIG. 2 is a view showing polygons in the 3D model.

The following embodiments render shaded NPR 2D images from data for 3D models. A 3D model 10 (FIG. 1) is comprised of interconnecting polygons 11 (FIG. 2). Polygons 11 are triangles in this embodiment; however, other types of polygons may be used. Groups of polygons are organized into meshes, each of which corresponds to an element of the 3D model. For example, arm band 12 and belt 14 each correspond to a different mesh in 3D model 10.

Figure 3:
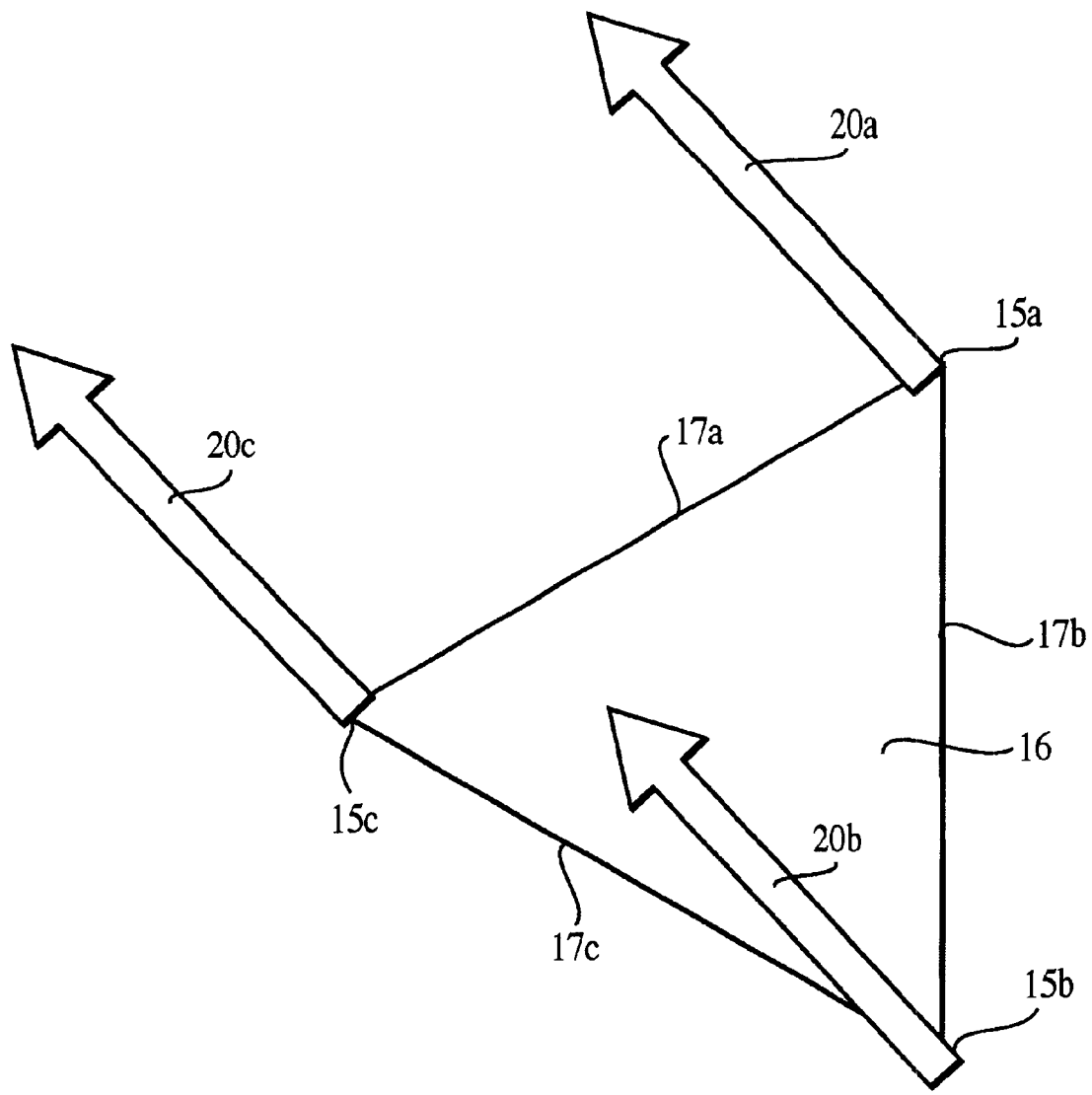
FIG. 3 is a close-up view of a polygon.

In FIG. 3, the 3D data for each triangular polygon is comprised of coordinates for three vertices 15a, 15b and 15c positioned in xyz (or other) space. These vertices define a face 16 and edges 17a, 17b and 17c for each polygon. The 3D data associated with each vertex also includes image shading information, such as the color or gray level at the vertex and an area surrounding the vertex.

A normal vector ("normal") 20a, 20b and 20c at each respective vertex 15a, 15b and 15c affects how this shading is perceived relative to a predefined reference point (the "eyepoint") in the "virtual world" that 3D model 10 inhabits. The normal determines the amount of light that reaches the vertex from a predefined light source in the virtual world. Specifically, the dot product of the normal and a vector from the light source is obtained. This dot product defines the angle between the light and the normal. The amount of shading applied to each face is determined based on this angle. So, when the normal is changed, the shading also changes. Coordinates for the normals may be stored with the 3D data for each vertex. Alternatively, a normal may be computed "on-the-fly" during image rendering.

Figure 4:
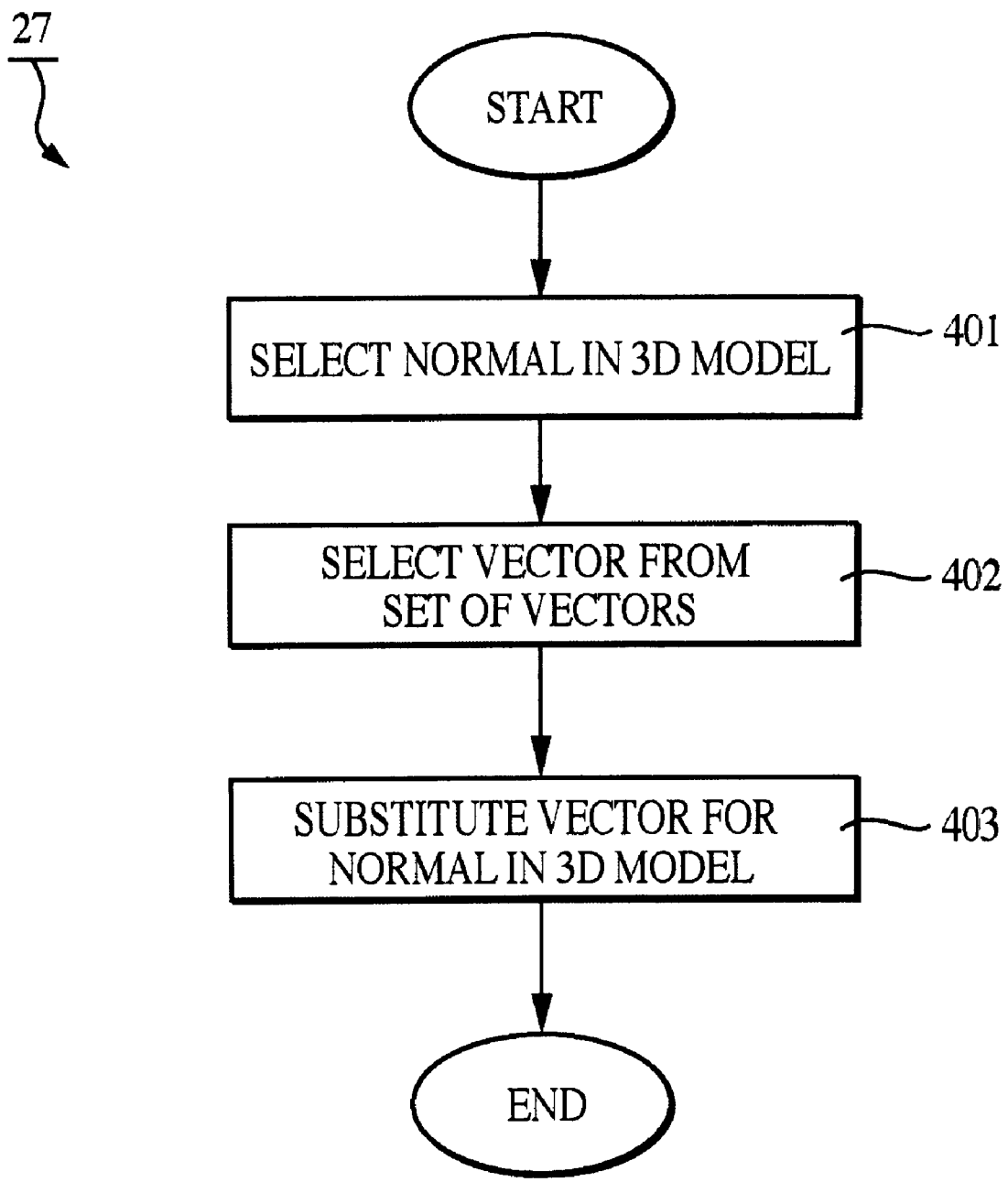
FIG. 4 is a flow diagram of an NPR process according to one embodiment of the invention.
Figure 5:
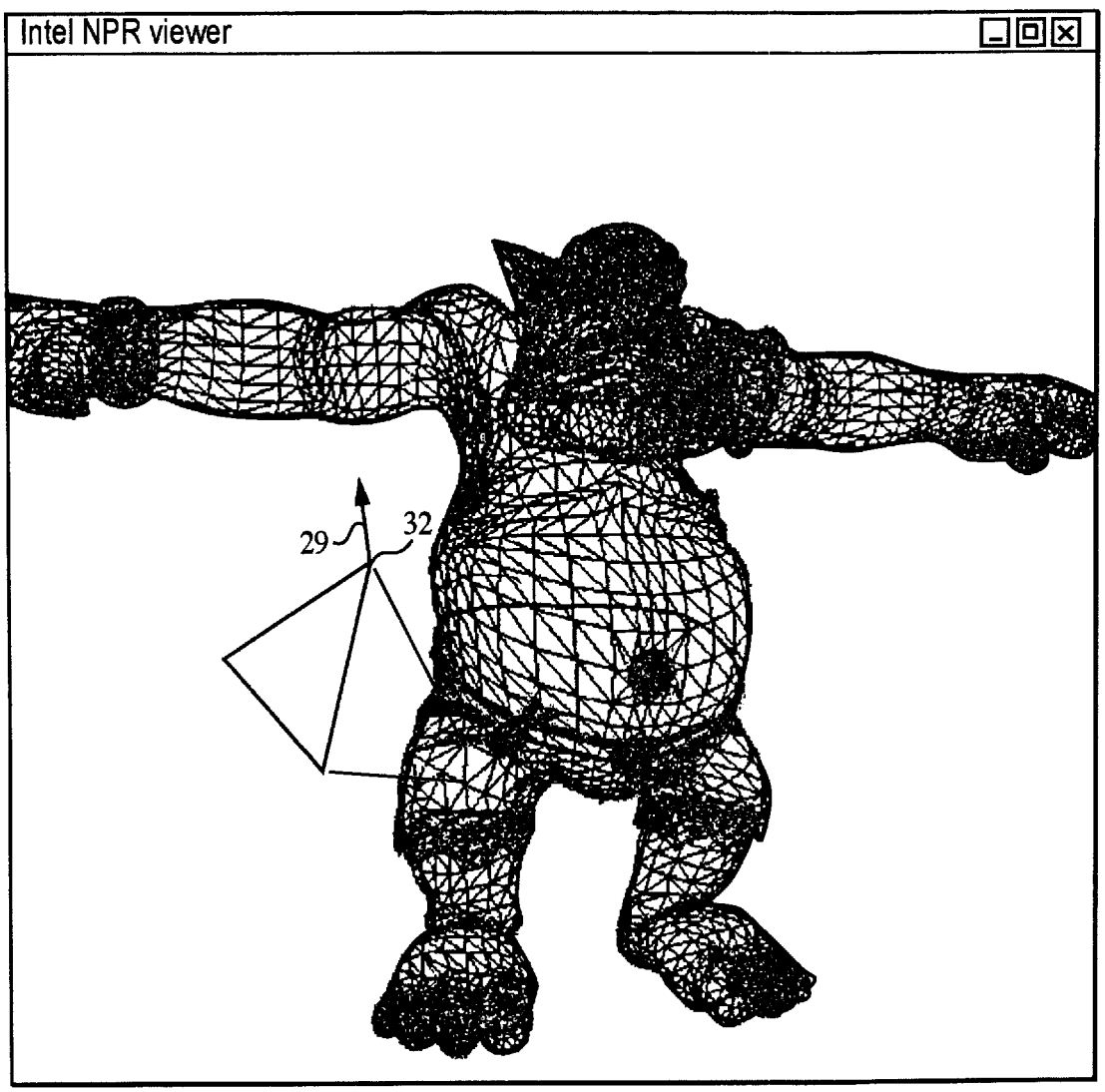
FIG. 5 is a view showing a normal vector to a vertex of a polygon in the 3D model.

FIG. 4 shows a process 27 for rendering NPR 2D images by substituting quantized vectors for normals in a 3D model. Quantized vectors are vectors having a uniform magnitude. Process 27 selects (401) a normal 29 to polygon vertex 32 in FIG. 5. The normals in 3D model 10 can be selected in any order from a database containing image data for the image. Process 27 selects (402) a vector from a set of quantized vectors and substitutes (403) the selected vector for the normal. Substitution may be performed by overwriting data (such as xyz coordinates) for the normal with data for the selected vector. The selection process (402) is described below for different sets/types of quantized vectors.

Parameterized Vectors

Figure 6B:
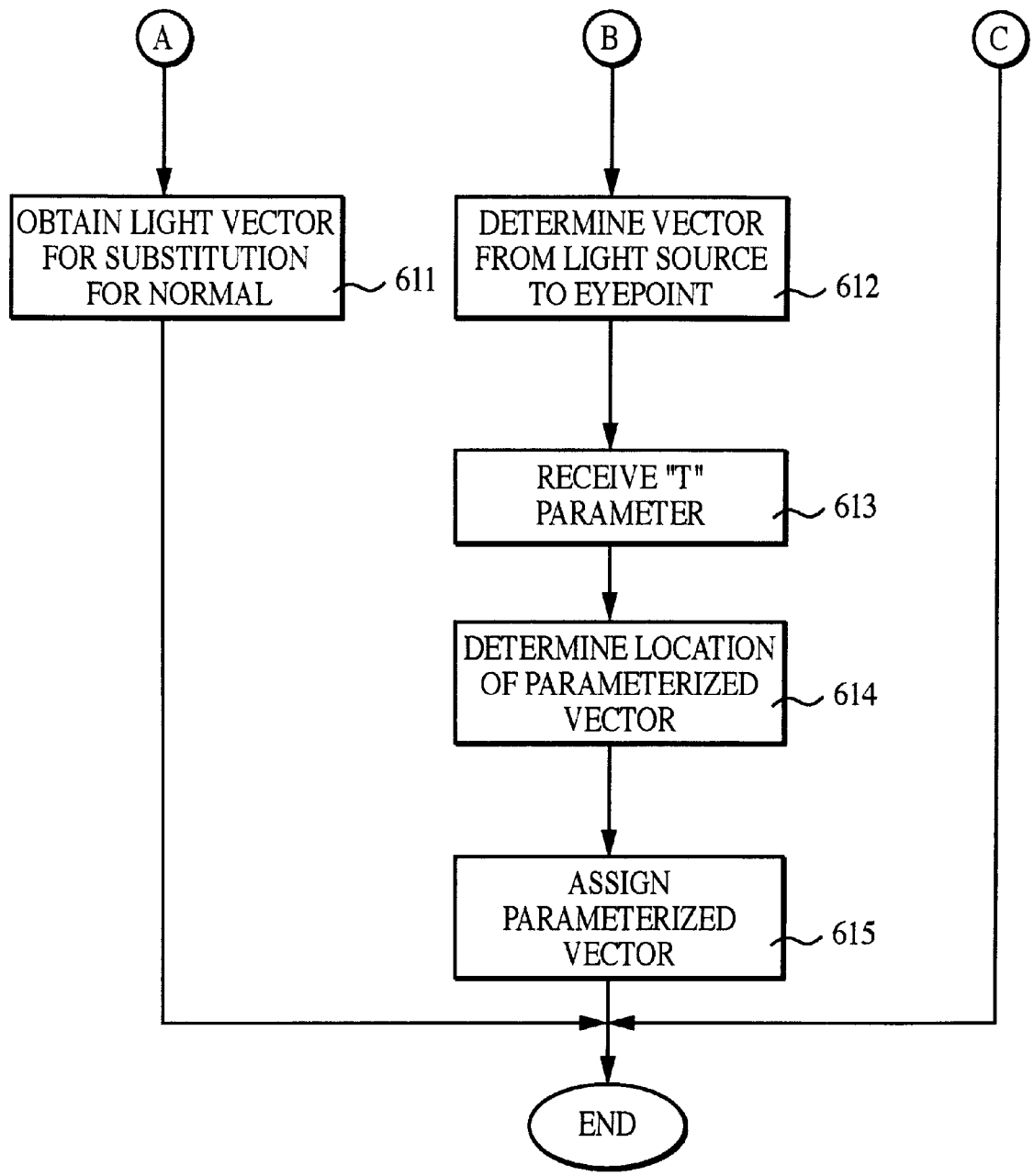
FIG. 6, comprised of FIGS. 6a and 6b, is a flow diagram showing part of an NPR process according to one embodiment of the invention.
Figure 7:
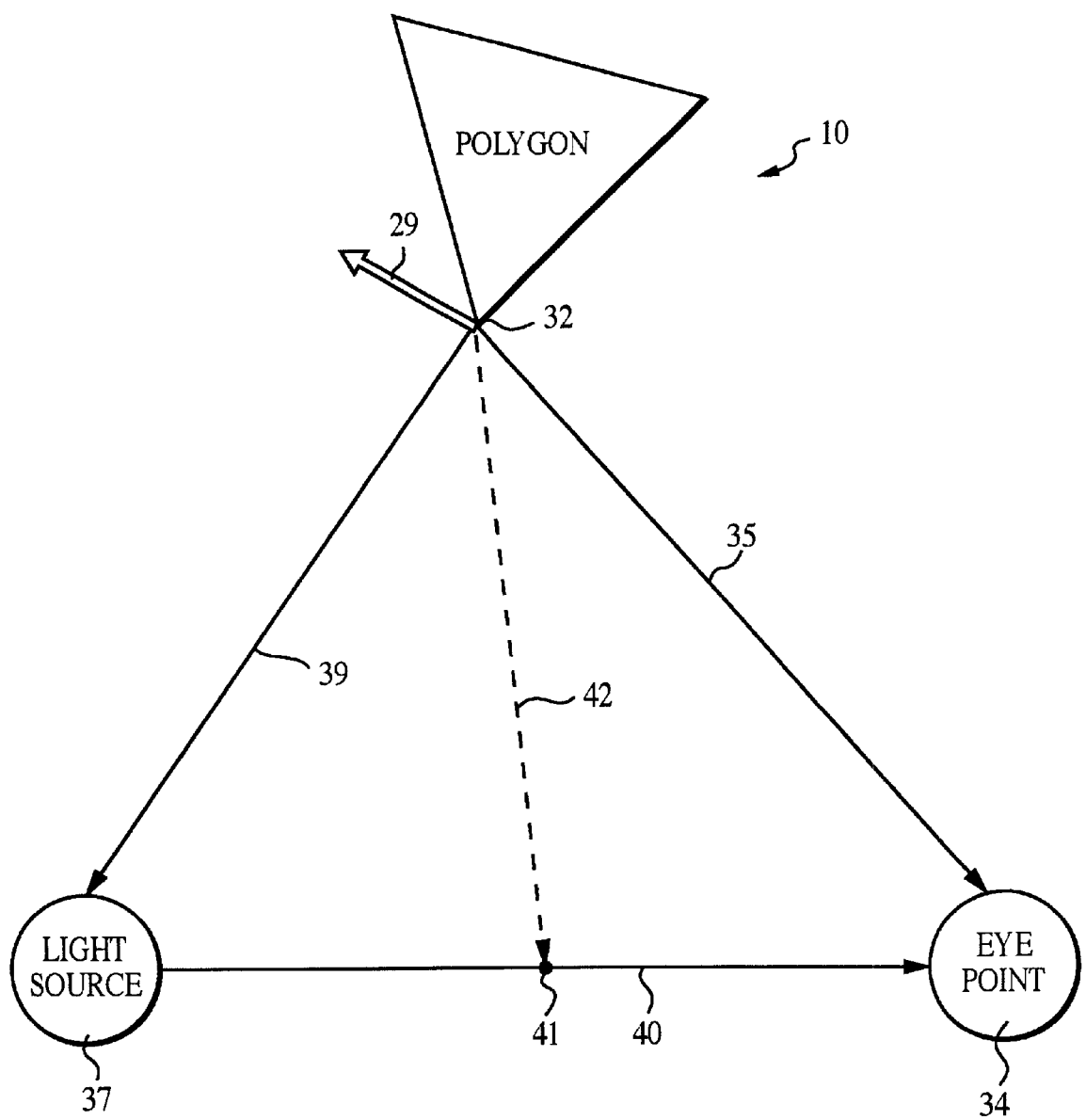
FIG. 7 is a close-up view of the normal vector.

FIG. 6 shows a process 30 for selecting (402) which of a set of quantized vectors to substitute for a normal of a polygon vertex. Process 30 is described with respect to FIG. 7, which shows a close-up view of polygon vertex 32.

Process 30 determines (601) a location of an eyepoint 34 in the virtual world inhabited by 3D model 10. The location of eyepoint 34 may be read from a database containing image data for 3D model 10, or it may be input from an external source. The same eyepoint may be used for all vertices of 3D model 10. Process 30 determines (602) an eyepoint vector (vert2eye 35) from vertex 32 to eyepoint 34. Vert2eye 35 is defined by the xyz coordinates of vertex 32 and eyepoint 34, and points from vertex 32 to eyepoint 34.

Process 30 determines (603) a value "eyedotface" by taking the dot product of vert2eye 35 and normal 29. Eyedotface indicates whether normal 29 is facing forward relative to eyepoint 34, in which case eyedotface has a positive value, or backward relative to eyepoint 34, in which case eyedotface has a negative value. If eyedotface has a negative value (604), process 30 leaves (605) normal 29 unchanged. If normal 29 is facing backward, it will not be rendered when 3D model 10 is rendered in 2D and, thus, will not affect the shading of the resulting 2D image.

If eyedotface has a positive value (604), process 30 determines (606) a location of a light source 37 in the virtual world inhabited by 3D model 10. The location of light source 37 may be read from a database containing image data for 3D model 10, or it may be input from an external source. Alternatively, the location of light source 37 may be determined from 3D data that defines the virtual world. For example, this 3D data may be analyzed to determine the brightest point in the virtual world and that point may be designated as the light source 37. The same light source may be used for all vertices of 3D model 10.

Process 30 determines (607) a light vector (vert2light 39) from vertex 32 to light source 37. Vert2light 39 is defined by the xyz coordinates of vertex 32 and light source 37, and points from vertex 32 to light source 37. Process 30 then determines (608) a value "lightdotnorm" of the dot product of vert2light 39 and normal 29. Lightdotnorm is used to determine if normal 29 is within a predefined range, such as a spherical radius, of light source 37. To make this determination, lightdotnorm is compared (609) to a predefined threshold value that defines the range. If lightdotnorm is greater than this threshold, then normal 29 is within the range of light source 37; otherwise normal 29 is not within the range. If normal 29 is within the range (610), vert2light 39 is obtained 611 and substituted for normal 29 in 403 of FIG. 4.

If normal 29 is not within the predefined range of light source 37 (610) and normal 29 is not backward facing, process 30 selects a parameterized vector to substitute for normal 29 in 403 of FIG. 4. Process 30 determines (612) a vector (light2eye 40) from light source 37 to eyepoint 34. This is done by subtracting xyz coordinates for eyepoint 34 from xyz coordinates for light source 37.

Process 30 receives (613) a parameter ("T") which is used in defining coordinates of the parameterized vector. The parameter T may be received at any point in process 30 from an internal or external source. For example, T may be input by an animator from a keyboard or a mouse of a computer via a graphical user interface ("GUI") (not shown). Alternatively, T may be determined automatically (without user intervention). For example, incremented or random values of T may be determined by process 30 or by a routine called from process 30.

The parameter T is used in determining a point 41 on light2eye 40. The coordinates/location of point 41 are determined (614) by multiplying T by the coordinates of eyepoint 34 and adding, to the resulting product, the coordinates of light source 37. A parameterized vector (bwlight&eye 42) is assigned (615) from vertex 32 to point 41 on light2eye 40. The vector bwlight&eye 42 is then substituted for normal 29 in 403 of FIG. 4.

Figure 8:
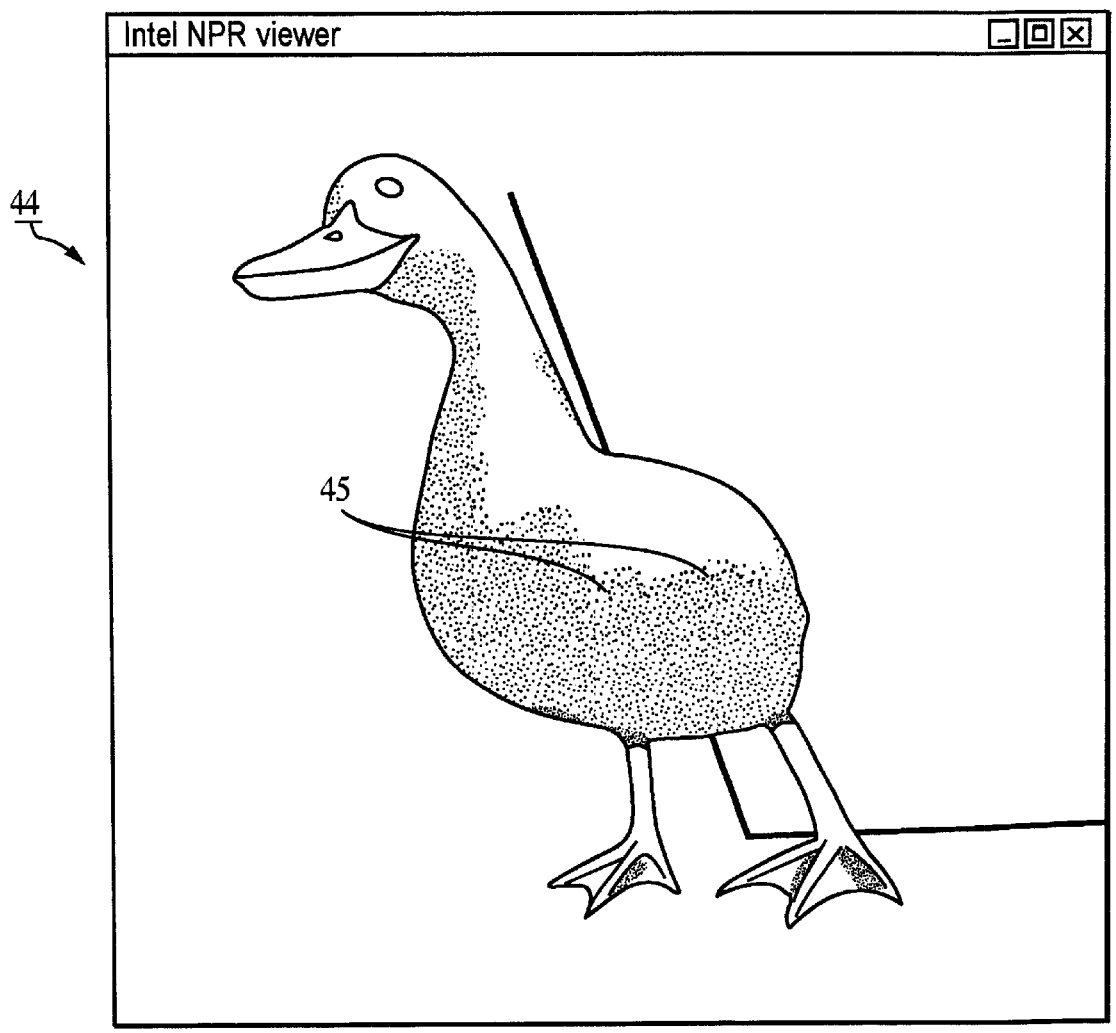
FIG. 8 is a view of an NPR 2D image formed by one embodiment of the invention.

A shaded 2D NPR image 44 produced by process 30 is shown in FIG. 8. As shown, process 30 achieves a smooth transition at the boundaries 45 of dark and light regions of image 44, which is similar to that achieved through traditional animation techniques. Advantageously, an animator may control process 30 at its outset (by specifying a value of T) or during run-time (by allowing the computer to generate values of T and then selecting a resulting image that is most aesthetically pleasing).

This embodiment is not limited to the implementation of process 30. For example, 601 to 605 can be performed for all normals in 3D model 10. After that, the normals can be analyzed in accordance with 606 to 615 to determine which vectors to substitute for the normals. Alternatively, 601 to 611 can be performed for all normals in 3D model 10, and then 612 to 615 can be performed for all remaining normals. This alternative saves the most computationally intensive processing for last. In still other alternatives, the order of the process can be changed. For example, 606 to 611 can be performed before 601 to 605.

An example of a computer program to implement process 30 is shown in the attached Appendix.

Subdivision Surface Vectors

This embodiment selects vectors from a set of vectors defined by a "subdivision" surface, and substitutes the selected vectors for vertex normals in a process we call normal quantization.

Figure 9:
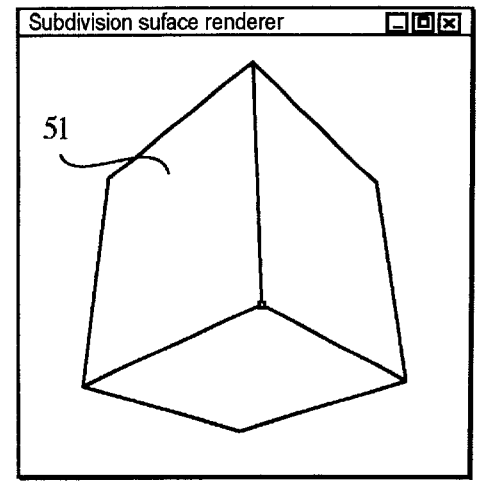
FIG. 9 is a view of a subdivision surface.
Figure 10:
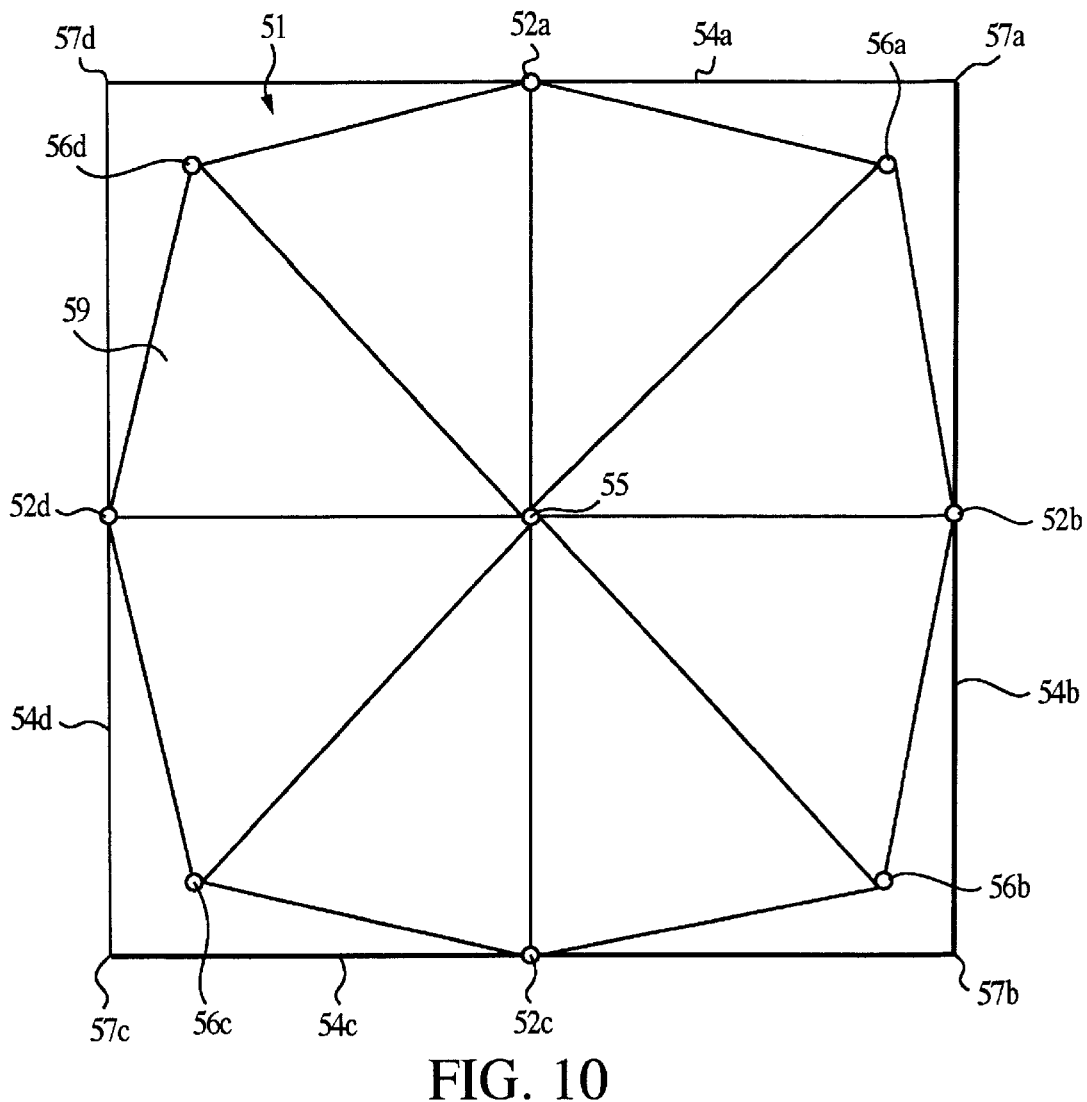
FIG. 10 is a view of a face of the subdivision surface which illustrates the Catmull Clark division method.

A subdivision surface is a 3D object, such as cube 50 of FIG. 9, that can be divided to obtain different 3D objects. One method for dividing a subdivision surface is the Catmull Clark method. See E. Catmull and J. Clark, "Recursively Generated B-Spline Surfaces On Arbitrary Topological Meshes", Computer-Aided Design, 10(6), pgs. 350 to 355 (September 1978). In this method, a face 51 of an initial subdivision surface (in this example, cube 50) is selected (FIG. 10), midpoints 52a, 52b, 52c and 52d of cube edges 54a, 54b, 54c and 54d are determined, and a center 55 of face 51 is determined and raised an amount relative to the plane of face 51. Points 56a, 56b, 56c and 56d are offset from corners 57a, 57b, 57c and 57d by an amount, and all defined points are connected in 3D space, resulting in surfaces 59.

Figure 12:
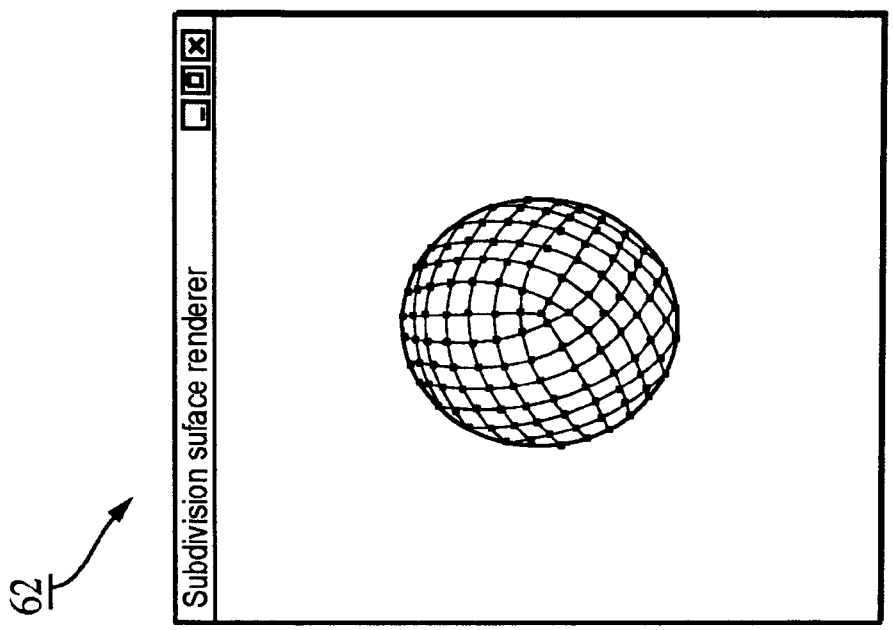
FIG. 12 is a view of a subdivision surface that results from performing two levels of Catmull Clark division on the subdivision surface of FIG. 9.
Figure 11:
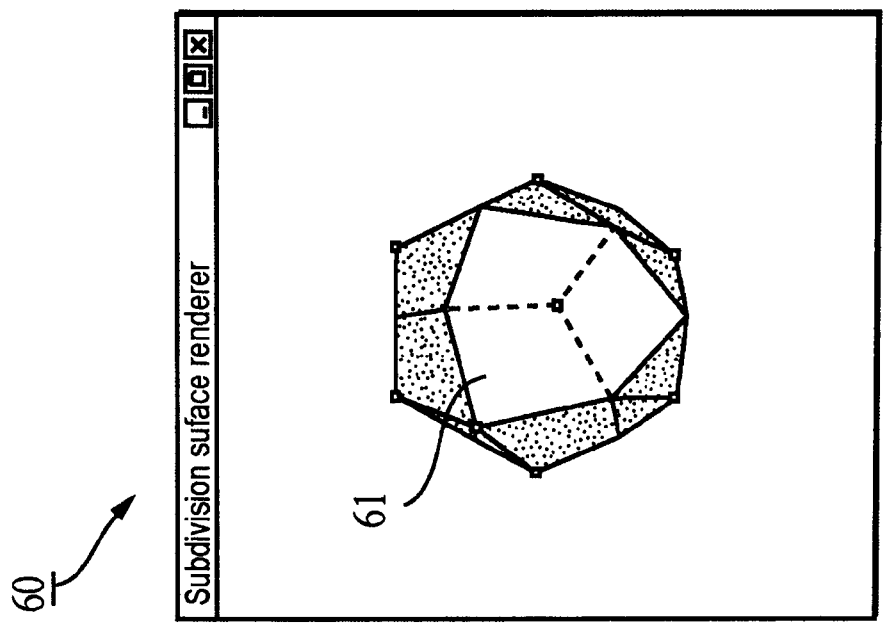
FIG. 11 is a view of a subdivision surface that results from performing one level of Catmull Clark division on the subdivision surface of FIG. 9.

The above method is performed on each of the six faces of cube 50, and the resulting faces are connected in 3D space. A first Catmull Clark subdivision of cube 50 produces object 60 (FIG. 11). In a second Catmull Clark division, each of faces 61 of object 60 is selected; the Catmull Clark method is repeated for each selected face; and the resulting objects are connected in 3D space. A second Catmull Clark division that began with cube 50 results in object 62 (FIG. 12). The Catmull Clark method may begin with an object other than a cube, such as a tetrahedron, and the number of subdivisions may vary. Repeating the Catmull Clark method ad infinitum produces a sphere when the original mesh is a cube.

Figure 13:
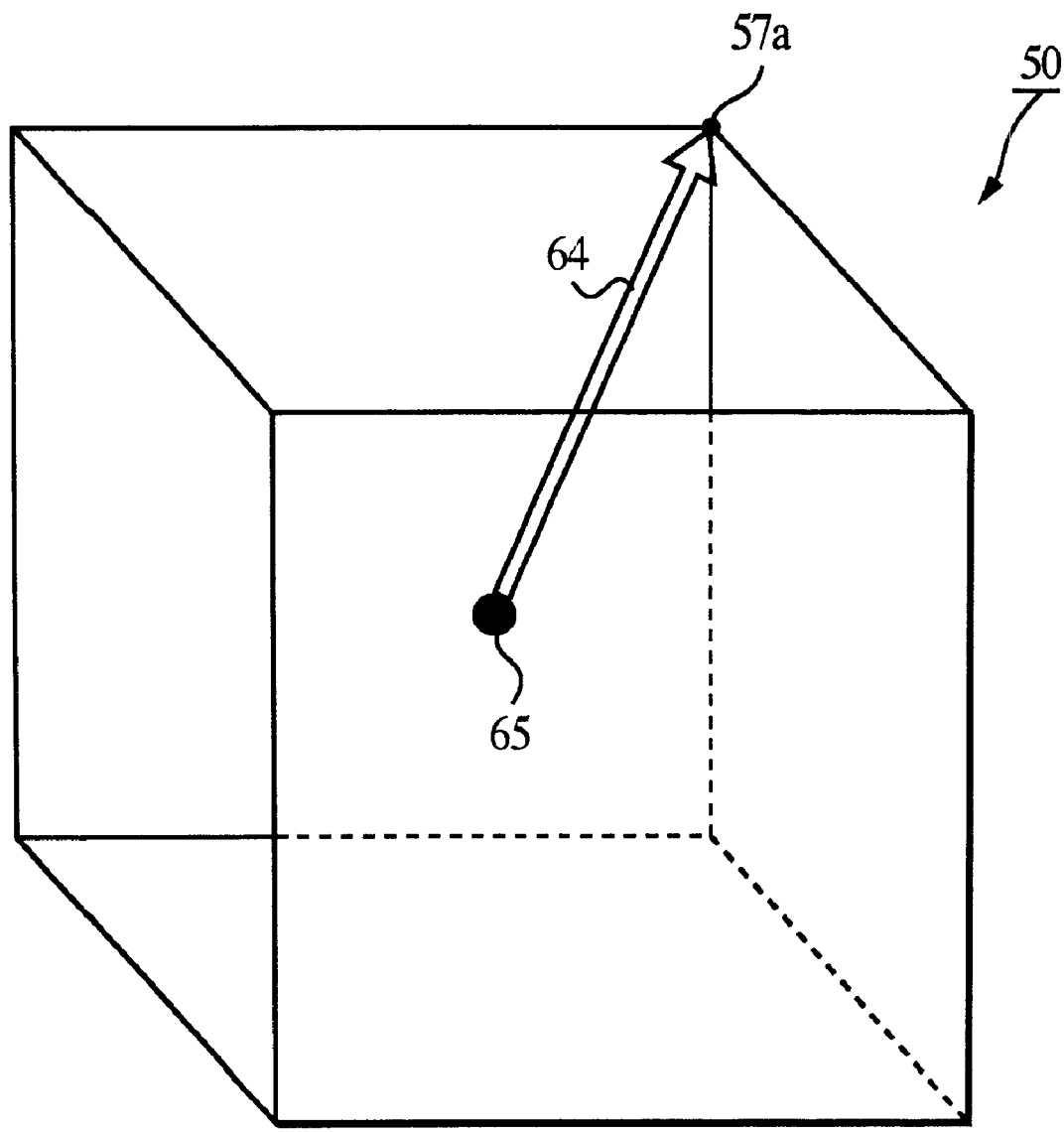
FIG. 13 is a view of the subdivision surface of FIG. 9 which also shows a quantized vector.

Quantized vectors are defined for a resulting subdivision surface. As shown in FIG. 13, a quantized vector 64 begins at the center 65 of cube 50 (for example) and terminates at a corner 57a of cube 50. One such vector is defined for each corner of the subdivision surface. The more corners a subdivision surface has (i.e., the more the surface is subdivided), the more quantized vectors are defined by that subdivision surface. For example, subdivision surface 60 (FIG. 11) has more quantized vectors than subdivision surface 50, and subdivision surface 62 has more quantized vectors than subdivision surfaces 50 or 60. When starting with a cube as the initial subdivision surface, each subsequent division increases the number of quantized vectors fourfold.

Figure 14:
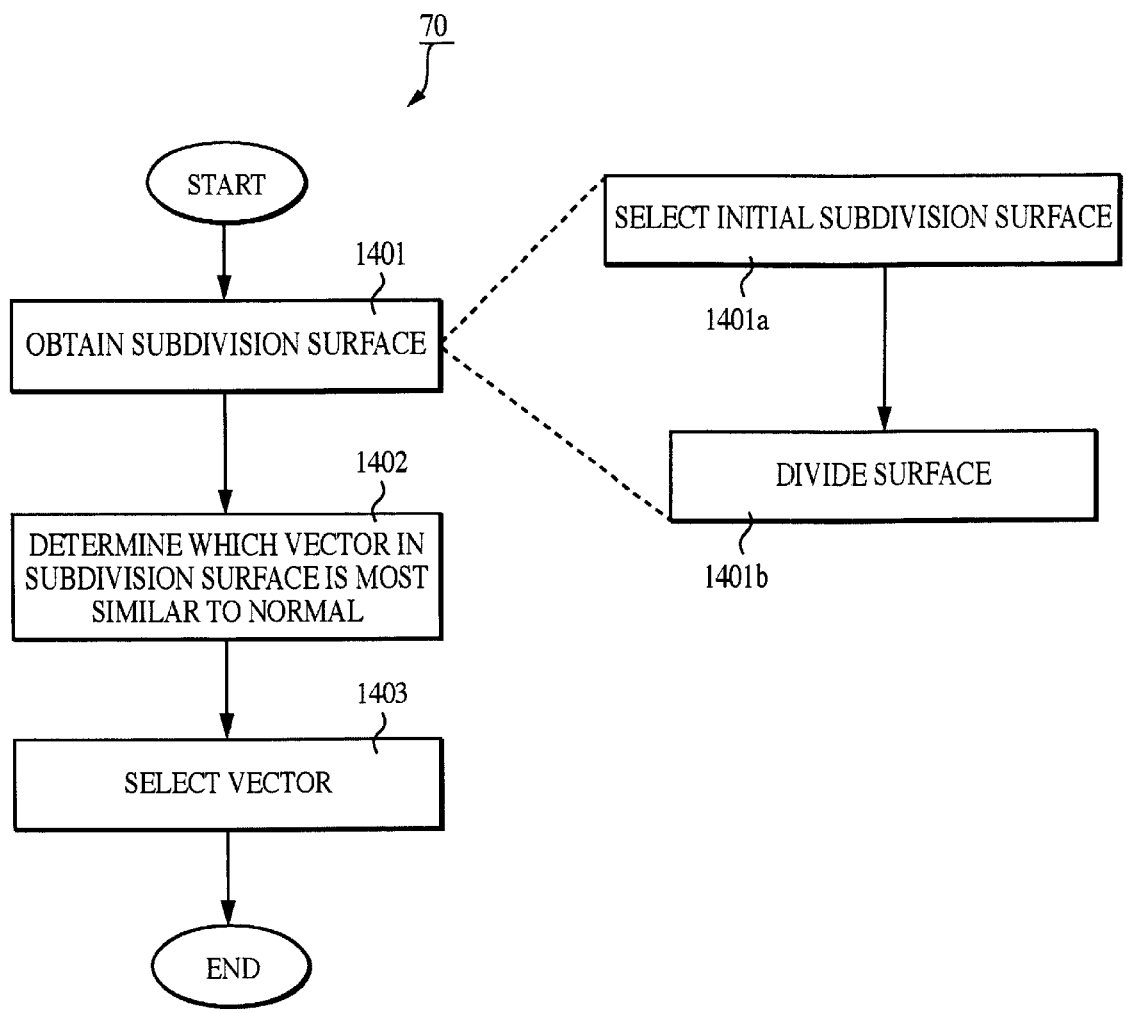
FIG. 14 is a flow diagram showing part of an NPR process according to one embodiment of the invention.

FIG. 14 shows a process 70 for selecting (402) (FIG. 4) which quantized vectors from a subdivision surface to substitute for a normal of a polygon vertex. Process 70 obtains (1401) a subdivision surface. This is done by selecting (1401a) an initial subdivision surface such as cube 50 and, optionally, dividing (1401b) the subdivision surface one or more times as desired. A process for selecting the number of divisions to be performed is described below. One method for dividing the subdivision surface is the Catmull Clark method described above; however, other methods may be used.

Process 70 determines (1402) which quantized vector (in the subdivision surface obtained in 1401) is most similar to the normal selected in 401 (FIG. 4). To do this, process 70 compares (xyz) coordinates of the normal with (xyz) coordinates of the quantized vectors in the subdivision surface. The quantized vector with coordinates that are closest to the coordinates of the normal is selected (1403) and substituted (403) (FIG. 4) for the normal, thereby producing an NPR shaded image.

Following substitution of the quantized vectors for the normals of an image, the image may be displayed to an animator. The animator may then adjust the shading of the image via a GUI or the like. For example, the animator may adjust the shading so that the image more closely resembles a 3D model, or the animator may adjust the shading so that the image deviates even further from 3D.

By way of example, if an animator adjusts the shading of an image so that the image more closely resembles a 3D model, a selected subdivision surface will be divided one (or more) times to obtain quantized vectors that more closely approximate the actual normals of the 3D model. At some point, the quantized vectors may so closely approximate the normals that vector substitution changes the image very little. (At the extreme, where the subdivision surface is a sphere, there will be a quantized vector that exactly matches the normal). If the animator adjusts the shading so that the image deviates further from 3D, then a new subdivision surface is selected, and the subdivision surface is divided to obtain quantized vectors that are appropriate for the desired shading level. Process 70 can be optimized to run in lg(n) time, where "n" is the number of faces of the subdivision surface.

Figure 15B:
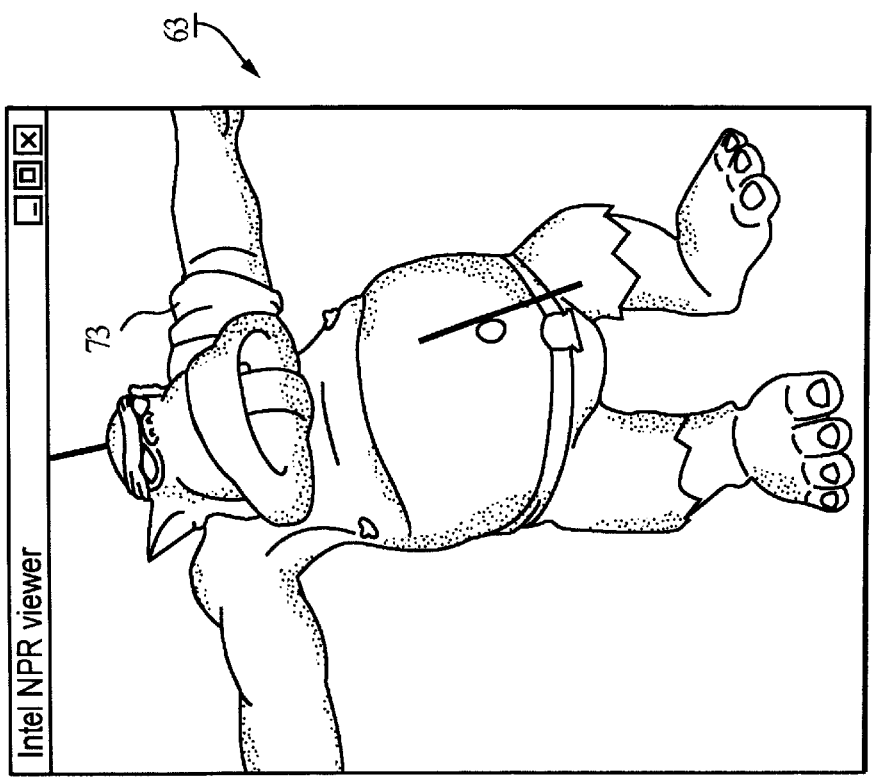
Figure 15A:
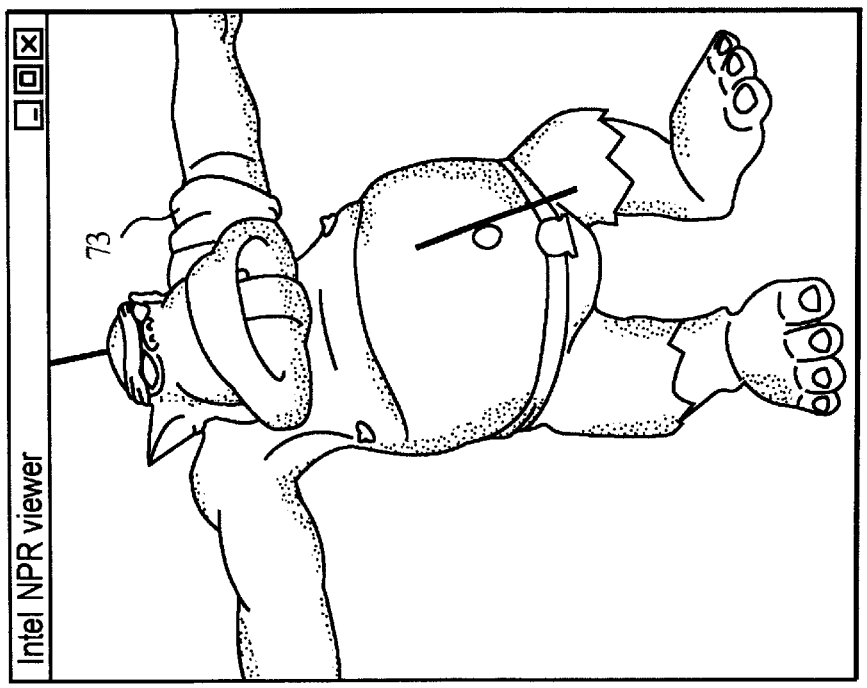
FIG. 15a is a view of an NPR 2D image formed by one embodiment of the invention.

FIG. 15a shows an example of an NPR 2D image 68 rendered by process 70 using subdivision surface 62 (FIG. 12). In image 68, curvatures are more pronounced than in the gouraud rendering 63 shown in FIG. 15b. For example, metallic objects, such as arm band 73, take on a more specular (or exaggerated) appearance in image 68.

Use of quantized vectors from a subdivision surface can reduce the amount of data that is associated with a 3D model. For example, instead of including coordinates for a normal at the vertex of each polygon (as is done conventionally), data for a 3D model may include an appropriate subdivision surface (with quantized vectors) and an index at each vertex to one of the vectors in the subdivision surface. This form of data "compression" reduces the amount of memory that is required to store the data and the amount of bandwidth required to transmit the data, e.g., over a network, such as the Internet.

Processes 27, 30 and 70 may be performed to change the shading of only a particular color or texture of a 3D model, without affecting the remainder of the model. To make such changes to a 3D model, in 401 (FIG. 4), only those normals at vertices with specific shading information (such as a range of color values) are selected. Process 30 or 70 is then performed on those normals only. This may be controlled by a user. For example, the user could request a change in "red" shades via a GUI (not shown) or the like, which would initiate one (or both) of processes 30 and 70.

Processes 27, 30 and 70 have particular applicability to cartooning. For example, using these processes, NPR 2D cartoon images can be rendered and shaded for any perspective of an original 3D model. For example, original 3D model 10 can be positioned, and a shaded NPR 2D image rendered for that position using 3D data for model 10. The original model can then be repositioned and a shaded NPR 2D image rendered for the new position using the same 3D data. Thus, the data for a 3D model need only be defined once and then, using processes 27, 30 and 70, a substantial portion of the animation can be performed automatically on a computer.

Another benefit of processes 27, 30 and 70 is that they do not require an animator to label vertices by bin. As a result, processing time is decreased, and the amount of storage space required for the image data is decreased.

Processes 27, 30 and 70 are performed in 3D space, meaning that they are performed using 3D data. By processing data in 3D space (as opposed to 2D space), processes 27, 30 and 70 can be performed using graphics accelerator cards of a personal computer.

Figure 16:
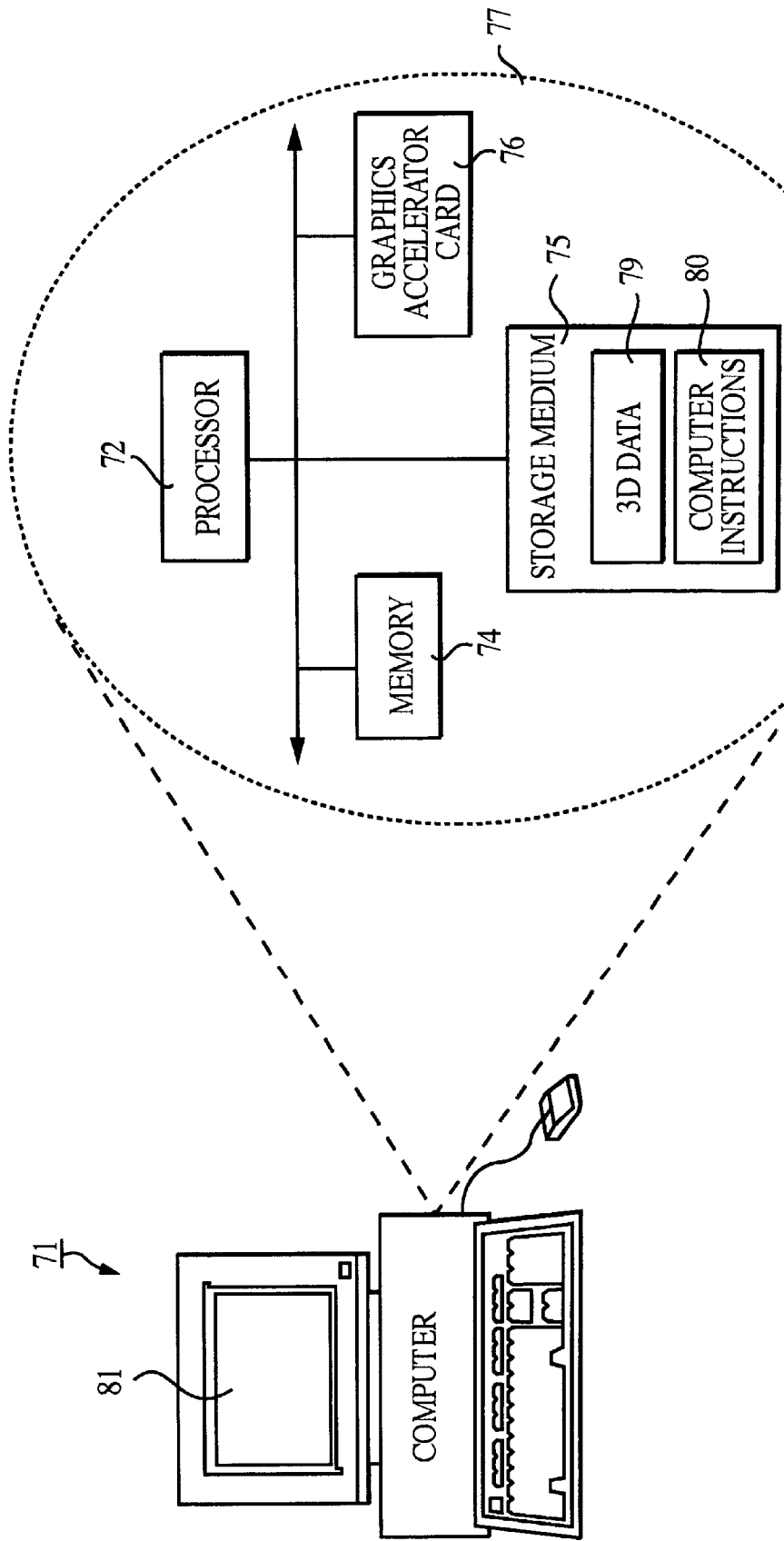
FIG. 16 is a view of computer hardware used to implement one embodiment of the invention.

FIG. 16 shows a computer 71 for rendering NPR images using processes 27, 30 and/or 70. Computer 71 includes a processor 72, a memory 74, a storage medium 75 (e.g., a hard disk), and a 3D graphics accelerator card 76 for repositioning a 3D model and manipulating 3D data (see view 77). Storage medium 75 stores 3D data 79, and computer instructions 80 for rendering NPR images via processes 27, 30 and 70.

Processes 27, 30 and 70, however, are not limited to use with any particular hardware or software configuration; they may find applicability in any computing or processing environment. Processes 27, 30 and 70 may be implemented in hardware, software, or a combination of the two. Processes 27, 30 and 70 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform processes 27, 30 and 70 and to generate output information. The output information may be applied to one or more output devices, such as display screen 81 of FIG. 16.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 27, 30 and 70. Processes 27, 30 and 70 may also be implemented as a computer-readable storage medium, configured with a computer program, where, upon execution, instructions in the computer program cause the computer to operate in accordance with processes 27, 30 and 70.

Other embodiments not described herein are also within the scope of the following claims.

What is claimed is:

1. A method for use in rendering a non-photorealistic image from an original model, comprising:

selecting a normal in the original model that is not within a predetermined range of a virtual light source that illuminates the original model;

defining a single vector connecting the virtual light source and a virtual eyepoint from which the original model is viewed;

selecting a parameterized vector that goes from a point on the original model that corresponds to the normal to a point on the single vector; and substituting the parameterized vector for the normal to produce a non-photorealistic image corresponding to the original model.

2. The method of claim 1, further comprising selecting the vector from a set of vectors.

3. The method of claim 2, further comprising:

selecting a normal that is within the predetermined range of the virtual light source; and substituting a light vector for the normal that points towards the virtual light source.

4. A method for use in rendering a non-photorealistic image from an original model having a normal, comprising:

obtaining a subdivision surface that defines a set of vectors;

determining a vector defined by the subdivision surface that is most similar to the normal;

substituting the vector for the normal in the original model; and storing an index to the subdivision surface along with data for the original model, the index corresponding to the vector substituted for the normal.

5. The method of claim 4, wherein obtaining comprises:

selecting an initial surface; and dividing the initial surface to obtain the subdivision surface.

6. A method for use in rendering a non-photorealistic image from an original model having a normal, comprising:

determining a location of a virtual light source relative to the original model;

substituting a light vector for the normal if the normal is within a range of the virtual light source; and substituting a parameterized vector for the normal if the normal is not within the range of the virtual light source, the parameterized vector comprising a vector that goes from a point on the original model that corresponds to the normal to a point on a single vector from the virtual light source to a virtual eyepoint from which the original model is viewed.

7. The method of claim 6, further comprising:

determining a location of the virtual eyepoint relative to the original model.

8. The method of claim 7, further comprising receiving a parameter for use in defining coordinates of the parameterized vector.

9. The method of claim 7, further comprising leaving the normal unchanged if the normal points away from the virtual eyepoint.

10. An article comprising a computer-readable medium that stores instructions for use in rendering a non-photorealistic image of an original model, the instructions for causing a computer to:

select a normal in the original model that is not within a predetermined range of a virtual light source that illuminates the original model;

define a single vector connecting the virtual light source and a virtual eyepoint from which the original model is viewed;

select a parameterized vector that goes from a point on the original model that corresponds to the normal to a point on the single vector; and substitute the parameterized vector for the normal to produce a non-photorealistic image corresponding to the original model.

11. The article of claim 10, further comprising instructions that cause the computer to select the parameterized vector based on an input parameter that corresponds to a location on the single vector.

12. The article of claim 11, further comprising instructions that cause the computer to:

select a normal that is within the predetermined range of the virtual light source; and substitute a light vector for the normal that points towards the virtual light source.

13. An article comprising a computer-readable medium that stores instructions for use in rendering a non-photorealistic image of an original model having a normal, the instructions for causing a computer to:

obtain a subdivision surface that defines a set of vectors;

determine a vector defined by the subdivision surface that is most similar to the normal;

substitute the vector for the normal in the original model; and store an index to the subdivision surface along with data for the original model, the index corresponding to the vector substituted for the normal.

14. The article of claim 13, wherein obtaining comprises:

selecting an initial surface; and dividing the initial surface to obtain the subdivision surface.

15. An article comprising a computer-readable medium that stores instructions for use in rendering a non-photorealistic image of an original model having a normal, the instructions for causing a computer to:

determine a location of a virtual light source relative to the original model;

substitute a light vector for the normal if the normal is within a range of the virtual light source; and substitute a parameterized vector for the normal if the normal is not within the range of the virtual light source, the parameterized vector comprising a vector that goes from a point on the original model that corresponds to the normal to a point on a single vector from the virtual light source to a virtual eyepoint from which the original model is viewed.

16. The article of claim 15, further comprising instructions that cause the computer to:

determine a location of the virtual eyepoint relative to the original model.

17. The article of claim 16, further comprising instructions that cause the computer to receive a parameter for use in defining coordinates of the parameterized vector.

18. The article of claim 16, further comprising instructions that cause the computer to leave the normal unchanged if the normal points away from the virtual eyepoint.

19. An apparatus for use in rendering a non-photorealistic image of an original model, comprising:

a memory which stores computer instructions; and a processor which executes the computer instructions to (i) select a normal in the original model that is not within a predetermined range of a virtual light source that illuminates the original model, (ii) define a single vector connecting the virtual light source and a virtual eyepoint from which the original model is viewed, (iii) select a parameterized vector that goes from a point on the original model that corresponds to the normal to a point on the single vector, and (iv) substitute the parameterized vector for the normal to produce a non-photorealistic image corresponding to the original model.

20. The apparatus of claim 19, wherein the processor selects the parameterized vector based on an input parameter that corresponds to a location on the single vector.

21. The apparatus of claim 20, wherein the processor selects a normal that is within the predetermined range of the virtual light source and substitutes a light vector for the normal that points toward the virtual light source.

22. An apparatus for use in rendering a non-photorealistic image of an original model having a normal, comprising:

a memory which stores computer instructions; and a processor which executes the computer instructions to (i) obtain a subdivision surface that defines a set of vectors, (ii) determine a vector defined by the subdivision surface that is most similar to the normal, (iii) substitute the vector for the normal in the original model, and (iv) store an index to the subdivision surface along with data for the original model, the index corresponding to the vector substituted for the normal.

23. The apparatus of claim 22, wherein obtaining comprises:

selecting an initial surface; and dividing the initial surface to obtain the subdivision surface.

24. An apparatus for use in rendering a non-photorealistic image of an original model having a normal, comprising:

a memory which stores computer instructions; and a processor which executes the computer instructions to (i) determine a location of a virtual light source relative to the original model, (ii) substitute a light vector for the normal if the normal is within a range of the virtual light source, and (iii) substitute a parameterized vector for the normal if the normal is not within the range of the virtual light source, the parameterized vector comprising a vector that goes from a point on the original model that corresponds to the normal to a point on a single vector from the virtual light source to a virtual eyepoint from which the original model is viewed.

25. The apparatus of claim 24, wherein the processor determines a location of the virtual eyepoint relative to the original model.

26. The apparatus of claim 25, wherein the processor receives a parameter for use in defining coordinates of the parameterized vector.

27. The apparatus of claim 25, wherein the processor leaves the normal unchanged if the normal points away from the virtual eyepoint.

28. A method for use in rendering non-photorealistic cartoon images from data for an original three-dimensional model, comprising:

positioning the three-dimensional model in a first position;

substituting vectors for normals in the data to produce a non-photorealistic cartoon image corresponding to a first position of the original three-dimensional model, at least one of the vectors comprising a parameterized vector that goes from a point on the three-dimensional model in the first position that corresponds to a normal to a point on a single vector from a virtual light source that illuminates the three-dimensional model to a virtual eyepoint from which the three-dimensional model is viewed;

positioning the three-dimensional model in a second position; and substituting vectors for normals in the data to produce a non-photorealistic cartoon image corresponding to the second position of original three-dimensional model, at least one of the vectors comprising a parameterized vector that goes from a point on the three-dimensional model in the second position that corresponds to a normal to a point on the single vector from the virtual light source to the virtual eyepoint.

29. The method of claim 28, further comprising selecting the parameterized vectors for the normals, for each position of the three-dimensional model, based on input parameters that correspond to locations on the single vector.

30. The method of claim 29, wherein, if a normal is within the predetermined range of the virtual light source, the method further comprises substituting a light vector for the normal that points towards the virtual light source.

* * * * *